(12) United States Patent
Fulton et al.

(10) Patent No.: US 10,087,746 B2
(45) Date of Patent: Oct. 2, 2018

(54) WELL TREATMENT DESIGN BASED ON THREE-DIMENSIONAL WELLBORE SHAPE

(71) Applicant: Halliburton Energy Services, Inc., Houston, TX (US)

(72) Inventors: Dwight David Fulton, Cypress, TX (US); Julio Vasquez, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/112,946

(22) PCT Filed: Feb. 28, 2014

(86) PCT No.: PCT/US2014/019611
§ 371 (c)(1),
(2) Date: Jul. 20, 2016

(87) PCT Pub. No.: WO2015/130317
PCT Pub. Date: Sep. 3, 2015

(65) Prior Publication Data
US 2017/0030187 A1    Feb. 2, 2017

(51) Int. Cl.
*E21B 47/10*  (2012.01)
*E21B 33/13*  (2006.01)
(Continued)

(52) U.S. Cl.
CPC .......... *E21B 47/101* (2013.01); *E21B 33/138* (2013.01); *E21B 43/162* (2013.01);
(Continued)

(58) Field of Classification Search
CPC .. E21B 33/138; E21B 47/101; E21B 47/0003; E21B 47/14
See application file for complete search history.

(56) References Cited

U.S. PATENT DOCUMENTS 2,010,755 A * 8/1935 Foley .................. E21B 47/0003
                                                    73/149
2,235,770 A * 3/1941 McConnell ......... E21B 47/0003
                                                    73/149
(Continued)

FOREIGN PATENT DOCUMENTS

WO    WO 99-35490 A1    7/1999
WO    WO 2012-068205 A2    5/2012

OTHER PUBLICATIONS

Amanullah et al., "A new Approach to Cement Slurry Calculation," Society of Petroleum Engineers, SPE 17018-MS, 1987, 10 pages.
(Continued)

*Primary Examiner* — Jennifer H Gay
(74) *Attorney, Agent, or Firm* — Craig Roddy; Parker Justiss, P.C.

(57) ABSTRACT

One example of well treatment design based on three-dimensional wellbore shape can be implemented as a computer-implemented method. Wellbore data including acoustic logging data that defines an internal shape of a wall of the wellbore at multiple locations around the perimeter of the wellbore can be received. A volume of an open hole portion of the wellbore that includes the multiple locations can be determined using the wellbore data. Using the volume of the open hole portion of the wellbore, a volume of a fluid loss treatment to treat the portion of the wellbore for well fluid loss can be determined.

22 Claims, 5 Drawing Sheets

(51) Int. Cl.
  *E21B 43/16*   (2006.01)
  *G01V 1/48*    (2006.01)
  *E21B 47/14*   (2006.01)
  *E21B 43/14*   (2006.01)
  *E21B 33/138*  (2006.01)
  *E21B 47/00*   (2012.01)

(52) U.S. Cl.
  CPC .......... *E21B 47/0003* (2013.01); *E21B 47/10* (2013.01); *E21B 47/14* (2013.01); *G01V 1/48* (2013.01); *E21B 43/14* (2013.01)

(56) References Cited

U.S. PATENT DOCUMENTS

| | | | | |
|---|---|---|---|---|
| 2,314,540 | A * | 3/1943 | Huntington | E02D 1/02 166/187 |
| 2,649,163 | A * | 8/1953 | Atkins, Jr. | E21B 47/0003 367/86 |
| 2,716,340 | A * | 8/1955 | Nance | E21B 47/0003 346/33 WL |
| 2,743,779 | A * | 5/1956 | Brown | E21B 33/138 166/290 |
| 2,859,614 | A * | 11/1958 | Larson | E21B 47/0003 73/149 |
| 3,020,952 | A * | 2/1962 | Sullivan | E21B 21/08 166/250.01 |
| 3,021,425 | A * | 2/1962 | Waldroop | E21B 47/0003 250/258 |
| 3,286,163 | A * | 11/1966 | Holser | G01V 3/30 250/269.1 |
| 3,330,374 | A * | 7/1967 | Broussard | G01V 1/50 367/27 |
| 3,369,626 | A * | 2/1968 | Zemanek, Jr. | E21B 47/0002 346/33 WL |
| 3,430,726 | A * | 3/1969 | Vogel | G01V 1/44 367/25 |
| 3,961,683 | A * | 6/1976 | Delignieres | E21B 47/0003 181/102 |
| 4,043,394 | A * | 8/1977 | Campbell | E21B 33/13 166/253.1 |
| 4,665,511 | A * | 5/1987 | Rodney | E21B 47/082 367/27 |
| 4,827,457 | A | 5/1989 | Seeman et al. | |
| 4,964,085 | A * | 10/1990 | Coope | E21B 47/082 324/338 |
| 5,001,676 | A * | 3/1991 | Broding | G01V 1/44 181/104 |
| 5,036,496 | A | 7/1991 | Rutledge | |
| 5,348,093 | A * | 9/1994 | Wood | E21B 49/006 166/250.14 |
| 5,451,779 | A * | 9/1995 | Spross | G01V 5/125 250/254 |
| 5,548,900 | A | 8/1996 | Hunt-Grubbe | |
| 5,638,337 | A * | 6/1997 | Priest | G01V 1/50 367/27 |
| 5,900,733 | A | 5/1999 | Wu et al. | |
| 6,041,860 | A * | 3/2000 | Nazzal | E21B 23/002 166/250.01 |
| 6,065,219 | A * | 5/2000 | Murphey | E21B 44/00 33/302 |
| 6,339,886 | B1 | 1/2002 | Reinhardt | |
| 6,384,605 | B1 * | 5/2002 | Li | G01V 3/30 324/338 |
| 6,466,513 | B1 | 10/2002 | Pabon et al. | |
| 6,483,777 | B1 * | 11/2002 | Zeroug | E21B 47/0005 367/35 |
| 6,618,322 | B1 | 9/2003 | Georgi | |
| 6,725,162 | B2 * | 4/2004 | Edwards | E21B 47/082 324/338 |
| 6,829,947 | B2 * | 12/2004 | Han | E21B 47/01 73/861.19 |
| 7,279,677 | B2 | 10/2007 | Ellis et al. | |
| 7,884,951 | B2 | 2/2011 | Prouvost et al. | |
| 9,720,121 | B2 * | 8/2017 | Zhou | G01V 1/44 |
| 2002/0165670 | A1 * | 11/2002 | Ellis | G01V 5/12 702/8 |
| 2003/0114987 | A1 * | 6/2003 | Edwards | E21B 47/082 702/7 |
| 2003/0164952 | A1 * | 9/2003 | Deichmann | A61B 1/05 356/603 |
| 2004/0003658 | A1 * | 1/2004 | Han | E21B 47/01 73/152.47 |
| 2004/0255479 | A1 * | 12/2004 | Moake | E21B 47/08 33/544 |
| 2005/0259512 | A1 * | 11/2005 | Mandal | E21B 47/082 367/10 |
| 2008/0266577 | A1 * | 10/2008 | Prouvost | E21B 47/08 356/626 |
| 2009/0188718 | A1 * | 7/2009 | Kaageson-Loe | E21B 21/003 175/40 |
| 2009/0253594 | A1 * | 10/2009 | Dalrymple | C09K 8/512 507/222 |
| 2010/0155065 | A1 * | 6/2010 | Misselbrook | E21B 43/267 166/280.1 |
| 2011/0220349 | A1 * | 9/2011 | Dakin | E21B 21/003 166/250.08 |
| 2012/0000650 | A1 * | 1/2012 | James | E21B 33/13 166/250.14 |
| 2012/0188090 | A1 | 7/2012 | Wessling et al. | |
| 2012/0207552 | A1 * | 8/2012 | Masloff | E21B 43/28 405/263 |
| 2012/0253677 | A1 * | 10/2012 | Frunza | E21B 47/1015 702/9 |
| 2013/0030705 | A1 * | 1/2013 | Pei | E21B 47/082 702/6 |
| 2015/0177409 | A1 * | 6/2015 | Sofiienko | G01V 5/125 250/269.1 |
| 2016/0018548 | A1 * | 1/2016 | McCafferty | G01V 1/40 367/7 |
| 2017/0030187 | A1 * | 2/2017 | Fulton | E21B 33/138 |
| 2017/0096874 | A1 * | 4/2017 | Parsons | E21B 33/14 |
| 2017/0254183 | A1 * | 9/2017 | Vasques | E21B 41/0085 |
| 2017/0322332 | A1 * | 11/2017 | Cooper | G01V 1/40 |

OTHER PUBLICATIONS

PCT International Search Report and Written Opinion of the International Searching Authority, PCT/US2014/019611, dated Nov. 21, 2014, 16 pages.

* cited by examiner

WELL TREATMENT DESIGN BASED ON THREE-DIMENSIONAL WELLBORE SHAPE

CROSS-REFERENCE TO RELATED APPLICATIONS

This application is a U.S. National Phase Application under 35 U.S.C. § 371 and claims the benefit of priority to International Application Serial No. PCT/US2014/019611, filed on Feb 28, 2014, the contents of which are hereby incorporated by reference.

TECHNICAL FIELD

This disclosure relates to well treatment for well fluid loss.

BACKGROUND

In some secondary or tertiary well production operations implemented to retrieve formation fluids (e.g., oil, gas, hydrocarbons, combinations of them, or other formation fluids) from a reservoir, injection wells are formed near the production wells. Well fluid (e.g., water, carbon dioxide, steam, or other well fluid) can be flowed through an injection well into the formation fluid reservoir to cause the formation fluids to flow toward one or more adjacent production wells. The formation fluids can then be retrieved from the production wells. Ideally, well fluid flowed into an injection well would flow in a uniform, distributed manner through the formation, in both vertical and aerial (horizontal) directions, pressurizing the reservoir and sweeping with it the formation fluids. However, injected fluids will follow the path of least resistance, and there are several factors which can cause injected fluids to flow in a non-uniform manner into the reservoir. This results in suboptimal flow of injection fluid from the injection well to the production well and ineffective sweep of formation fluids. These factors include vertical and areal irregularities and heterogeneity in the formation which result in a preferential, non-distributed flow direction. Compounding this effect, the injection wellbore can become eroded due to wellbore or formation mechanical or chemical erosion due to fluid flow, wellbore casing corrosion, or other factors. For example, wellbore erosion can be a result of rock dissolution, eroded out zones, karsted zones, fractures, fissures, combinations of them, or other causes. Such erosion of the wellbore can affect the flow of injection fluid from the injection well to the production well.

DESCRIPTION OF DRAWINGS

Like reference symbols in the various drawings indicate like elements.

DETAILED DESCRIPTION

Figure 1A:
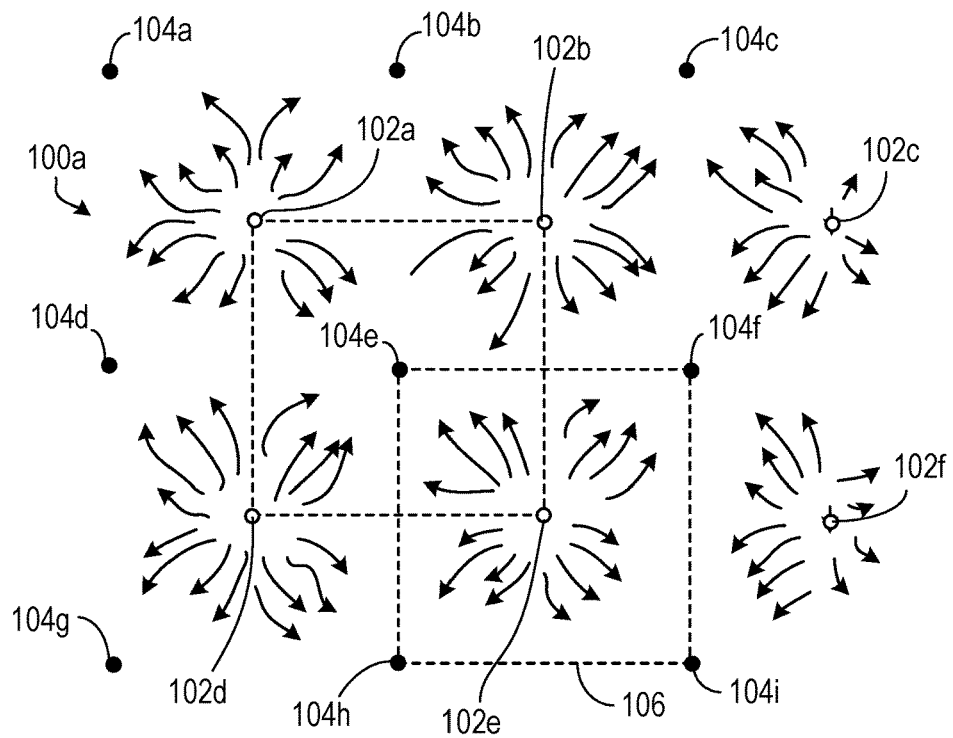
FIG. 1A is a schematic plan view diagram showing an injection well pattern of a homogeneous reservoir.

This disclosure relates to well treatment design based on three-dimensional wellbore shape. Well fluid flowed into an injection well tends to follow a path of least resistance that results due to several factors, e.g., wellbore erosion after an extended period of injection, wellbore casing corrosion, or other factors. The erosion, for example, can result from fluid flow into the subterranean zone (e.g., a formation, a portion of a formation, or multiple formations) in which the injection well is formed. For example, the erosion can be a result of rock dissolution, eroded out zones, karsted zones, fractures, fissures, combinations of them, or other causes. Such erosion to the subterranean zone can result in significant throughput of injection fluid from the injection well to the production well with limited flow (e.g., no flow) through the formation fluid reservoir. Consequently, the sweep efficiency (the ability of the injection fluids to cause formation fluids to be displaced to the production well(s)) of the injection process can be limited. In such situations, a conformance treatment can be conducted to place a volume of a fluid loss treatment into the injection well to block off the eroded section or that area of the injection wellbore taking an undesirable or disproportionate amount of the injection well fluid, thereby forcing well fluid preferentially into the formation fluid reservoir to increase sweep efficiency.

This disclosure describes techniques for well conformance treatment to cause injection fluids flowed into an injection well to flow in a desired path, i.e., to conform to a desired flow direction, e.g., into a producing formation of interest instead of a non-producing formation in a subterranean zone. In some implementations, wellbore imaging data can be obtained from acoustic logging data to diagnose the surface of a wellbore's inside diameter, e.g., to identify distance to the wellbore inside diameter and specific characteristics. Where there is a casing in the wellbore, these characteristics can include roughness or pitting of the casing internal diameter, indicating corrosion, as well as the thickness of the casing and density of the material behind the casing, such as cement, indicating a cement-filled annulus, or liquid, indicating a void in the annulus. Where the wellbore is an open hole section, these characteristics can include formation layer bedding, lithology, the presence and/or orientation of natural or induced fractures intersecting the wellbore, or combinations of them. This disclosure describes techniques to use the wellbore imaging data to determine an internal shape (e.g., a three-dimensional internal shape) of a portion of the wellbore experiencing well fluid loss. From the internal shape, in some implementations, a volume of the portion of the wellbore experiencing well fluid loss can be determined. Using the volume of the portion of the wellbore, a volume of a fluid loss treatment to treat the portion of the wellbore for undesirable or disproportionate well fluid loss can be determined.

The wellbore shape determined by implementing the techniques described here can indicate an erosion of the wellbore. The shape can be correlated with local well stratigraphy and geology to determine thief zones (those taking disproportionately large amounts of injected well fluid) and direction of well fluid loss. In addition, a volume of the eroded section of the wellbore can be used to determine a volume of well fluid treatment (e.g., a volume of sealant or other chemical treatment) that is appropriate for the wellbore. The techniques can be implemented in wellbore operations such as injection, well drilling, cementing, stimulation, or other wellbore operations. The internal shape and volume of the portion of the wellbore experiencing well fluid loss can be determined using acoustic logging data. The techniques described here can be implemented to measure a full 360° measurement of the internal shape of the portion of the wellbore. The techniques described here can be implemented to determine treatment volumes that are more accurate than techniques which determine treatment volumes based on drilled wellbore diameter and enlargement scaling factors. Such techniques are inherently limited by uncertainty. If such uncertainty resulted in (e.g.) too small of a treatment volume, then thief zones could be inadequately sealed off and injected well fluids would continue to flow in undesirable paths and suboptimally sweep formation fluids. If too large a volume, then both thief zones and reservoir zones could be sealed, resulting in loss of injectivity. Implementing the techniques described here can decrease, and, in some instances, minimize or eliminate, uncertainty in characterizing the thief zone (or zones) and appropriate treatment fluid volume. Consequently, fluid loss treatment placement and volume design can be optimized.

FIG. 1A is a schematic plan view diagram showing an injection well pattern of a homogeneous reservoir. In the homogeneous reservoir, multiple injection wells (e.g., injection wells 102a, 102b, 102c, 102d, 102e, 102f) and multiple production wells (e.g., production wells 104a, 104b, 104c, 104d, 104e, 10fg, 104g, 104h, 104i) are arranged in a pattern, here a 5-spot injection well pattern, to facilitate well production.

More or fewer injection and/or production wells than shown in FIG. 1A can be formed in the reservoir, and they can be arranged in another pattern. During production (e.g., during secondary or tertiary well production operations), injection fluid (e.g., water, carbon dioxide, steam, or other well fluid) can be flowed into the injection wells. In a homogeneous reservoir, the injection fluids tend to flow in a uniform distribution from an injection well along a theoretical aerial sweep flow lines represented by the arrows shown in FIG. 1A into a portion or portions of the subterranean zone that facilitate retrieval of the well fluid. For example, the injection fluid tends to flow uniformly into the formation that includes the production fluids, thereby causing the production fluids to flow into the surrounding production wells.

Figure 1B:
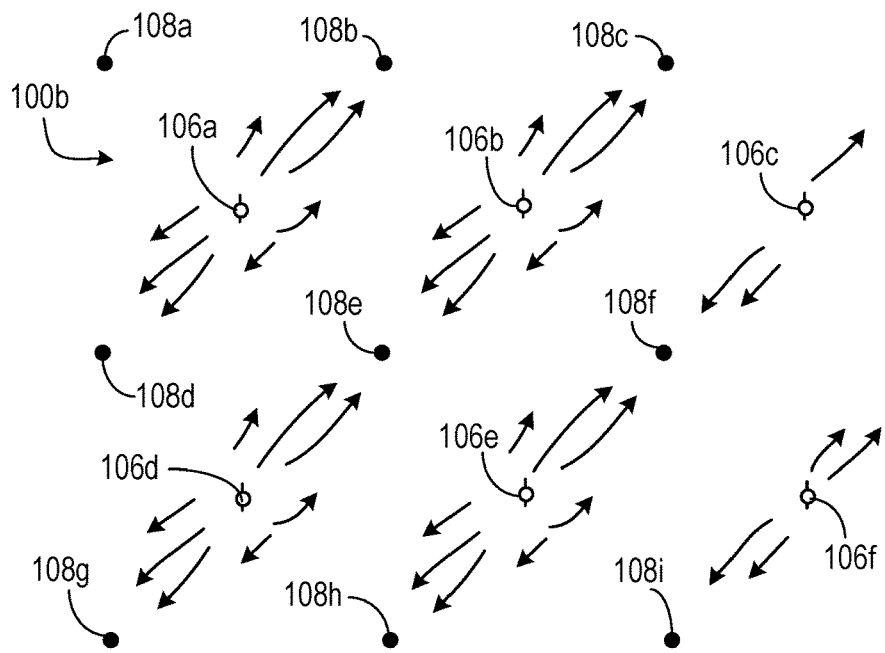
FIG. 1B is a schematic plan view diagram showing an injection well pattern of a heterogeneous reservoir.

FIG. 1B is a schematic plan view diagram also showing a 5-spot injection well pattern, but in a heterogeneous reservoir. Again, multiple injection wells (e.g., injection wells 106a, 106b, 106c, 106d, 106e, 106f) and multiple production wells (e.g., productions wells 108a, 108b, 108c, 108d, 108e, 108f, 108g, 108h, 108i) are arranged in a 5-spot injection well pattern, similar to the pattern shown in FIG. 1A. Due to factors such as erosion of internal portions of an injection wellbore, corrosion of the wellbore casing, karsted zones, fractures, fissures, combinations of them, or other factors, the injection fluid flowed through the injection wells follow paths of least resistance represented by the arrows shown around each injection well in FIG. 1B. For example, the injection fluids can sweep the formation in a relatively direct path to the production wells resulting in the path becoming the path of least resistance. Once the injection and production wells are bridged in this manner, the production well begins producing injection fluid. In another example, the well fluid can flow into non-producing formations in the subterranean zone. Alternatively, or in addition, not all of the injection fluid that is flowed through the injection well can flow into the formation that includes the production fluids resulting in inefficiency in the secondary or tertiary well production process or loss of production fluid or both.

Figure 2A:
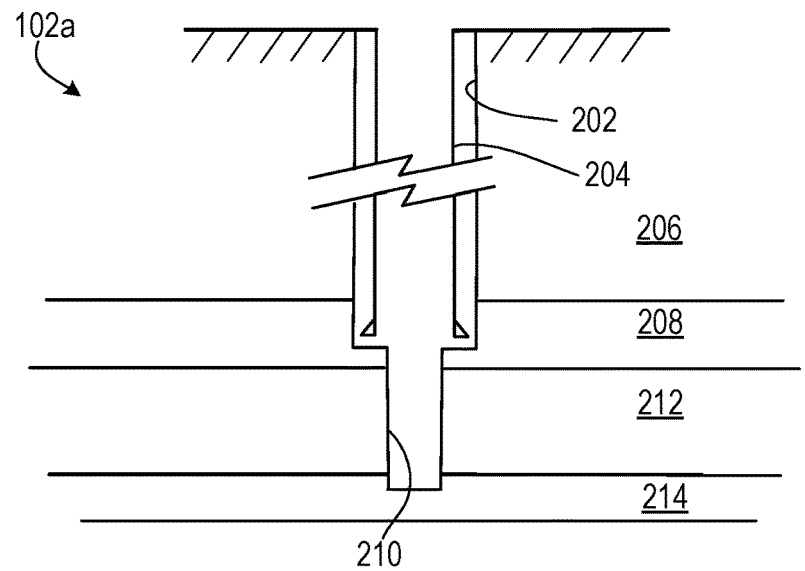
FIG. 2A is a schematic profile view diagram of an injection well including an open hole below a cased wellbore.

FIG. 2A is a schematic profile view diagram of an injection well 102a, which includes a wellbore 202 having a cemented casing 204 down to a certain depth and an open hole 210 below the casing 204. The cased and cemented portion of the wellbore 202 extends through a first subterranean zone 206 to a second subterranean zone 208 in which the injection well 102a is formed. The open portion below the cased portion (i.e., the open hole 210) extends below the cemented casing 204 through the second subterranean zone 208 and a third subterranean zone 212 to a fourth subterranean zone 214. In the example subterranean zone shown in FIG. 2A, the third subterranean zone 212 is a producing zone of interest. That is, the production fluids reside in the third subterranean zone 212; well fluid is flowed through the injection well 102a into the third subterranean zone 212 to cause the production fluids to be released into the production wells surrounding the injection well 102a. The cement in the annulus between the casing 204 and the hole 204 adjacent to subterranean zones 208 and 206 prevent well fluids from traveling up the outside of casing 204; they are restricted to flowing into subterranean zone 212 only. The first subterranean zone 206, the second subterranean zone 208 and the third subterranean zone 214 are other zones in the subterranean zone that are either non-producing or are non-completed zones (or both). The wellbore 202 and the open hole 210 are drawn showing that the internal portions of the injection well 102a have not been eroded significantly to affect the uniformly distributed flow of well fluid flowed through the injection well 102a into the third subterranean zone 212 toward the surrounding production wells, e.g., production wells 104a, 104b, 104d and 104e.

Figure 2B:
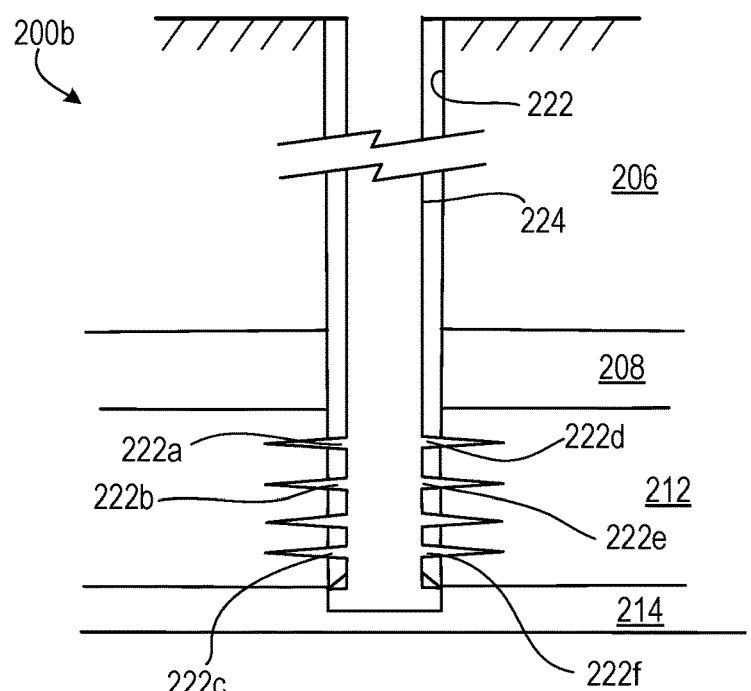
FIG. 2B is a schematic profile view diagram of an injection well including a perforated wellbore.

FIG. 2B is a schematic profile view diagram showing the injection well 200b including a wellbore 222 having a cemented casing 224 extending from surface or some upper portion of the well down to total depth. The wellbore 222 is formed through the subterranean zones 206, 208, 212 and 214, of which the subterranean zone 212 is the producing zone of interest. The casing 224 is cemented in place in the wellbore 222. The casing 224 includes multiple perforations (e.g., perforations 222a, 222b, 222c, 222d, 222e, 222f), which are openings created in the casing and cement annular sheath through which well fluid can pass. The perforations allow injection well fluid to pass down injection well 200b, exiting the wellbore through perforations 222a, 222b, 222c, 222d, 222e, or 222f, and flow into the producing zone of interest 212. The wellbore 222 is drawn showing that the casing 224 has not been corroded and the internal portions of the injection well 200b have not been eroded significantly to affect the uniformly-distributed flow of well fluid into zone 212 toward the surrounding production wells.

Figure 2C:
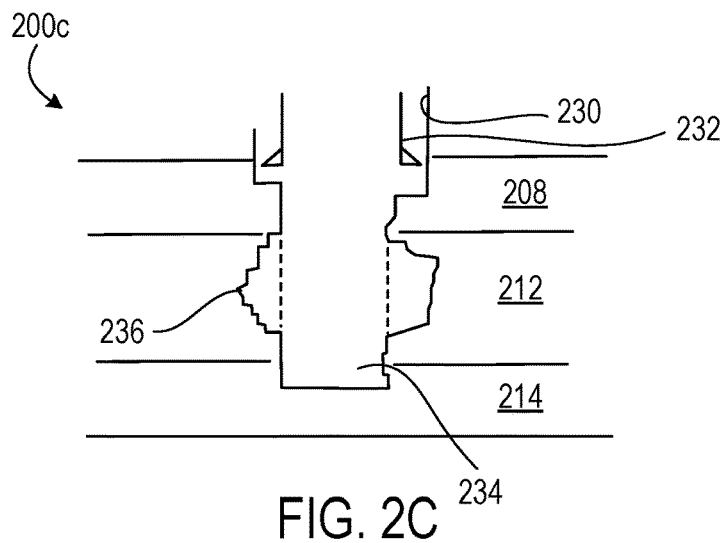
FIGS. 2C-2G are schematic profile view diagrams showing injection wells including internal portions with defects that cause well fluid loss.

FIGS. 2C-2H are schematic profile view diagrams showing injection wells including internal portions with the effects of erosion that cause well fluid loss. FIG. 2C is a schematic profile view diagram showing the injection well 200c including an internal portion that has been eroded or dissolved resulting in an enlargement of the internal portion. Similarly to FIG. 2A, the wellbore 230 includes a cemented casing 232 that extends from the surface to the subterranean zone 208. The wellbore 230 also includes an open hole 234 which extends below the casing 232 through the subterranean zone 208, the subterranean zone 212, which is the producing zone of interest, and the subterranean zone 214. The internal portion of the open hole 234 includes an enlargement 236 resulting, e.g., from erosion or dissolution of the open hole 234, or other reasons. That is, during forming the injection well 200c, the open hole 234 was drilled to have a specified internal diameter. Due to erosion or dissolution of rock around of the open hole 234, the internal diameter of the portion of open hole 234 has enlarged relative to the specified internal diameter resulting in the enlargement 236.

Figure 2D:
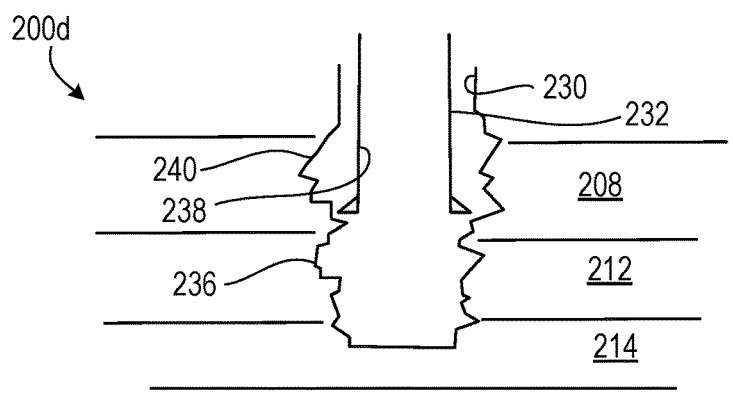

FIG. 2D is a schematic profile view diagram showing the injection well 200d, which includes a wellbore 230 having a cemented casing 232 and an open hole extending below the casing 232. The wellbore 230 is formed through the subterranean zone 208, the subterranean zone 212, which is the producing zone of interest, and the subterranean zone 214. A portion of the wellbore 230 above the open hole (i.e., adjacent the cemented casing 232) can include an enlargement 236 across producing zone 212, and an enlargement 240 across zone 208 behind casing 232. For example, the well fluid (or other fluid flowed through the injection well 200d) can have corroded or flowed behind a portion 238 of the casing 232. The fluid leaking through the corroded or bypassed portion 238 into the wellbore 230 can have resulted in the enlargement 240. In addition, the injection well 200d can include the enlargement 236 resulting, e.g., from erosion or dissolution of the rock around the open hole, or other reasons.

Figures 2E, 2F:
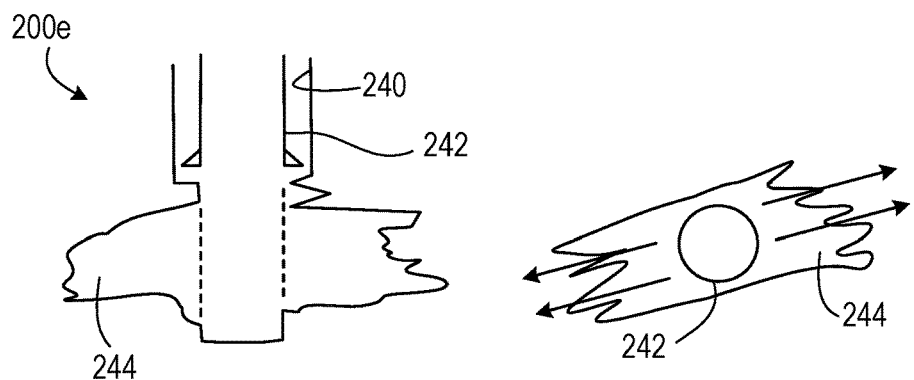

FIGS. 2E and 2F are schematic profile view diagrams showing a profile and a plan view, respectively, of enlargements to an internal portion of an injection well 200e including a wellbore 240 having a casing 242 and an open hole section below the casing. The open hole portion of the wellbore 240 includes an enlargement 244 resulting from deep erosion or dissolution of the rock around the wellbore 240. The arrows shown in FIG. 2F represent directions of well fluid flow from the injector well 200e to adjacent production wells. This directional erosion can be a result of rock dissolution, eroded out zones, karsted zones, fractures, fissures, combinations of them, or other causes. Such heterogeneous flow could result in non-uniform aerial sweep of formation fluids, such as depicted in FIG. 1B.

Figure 2G:
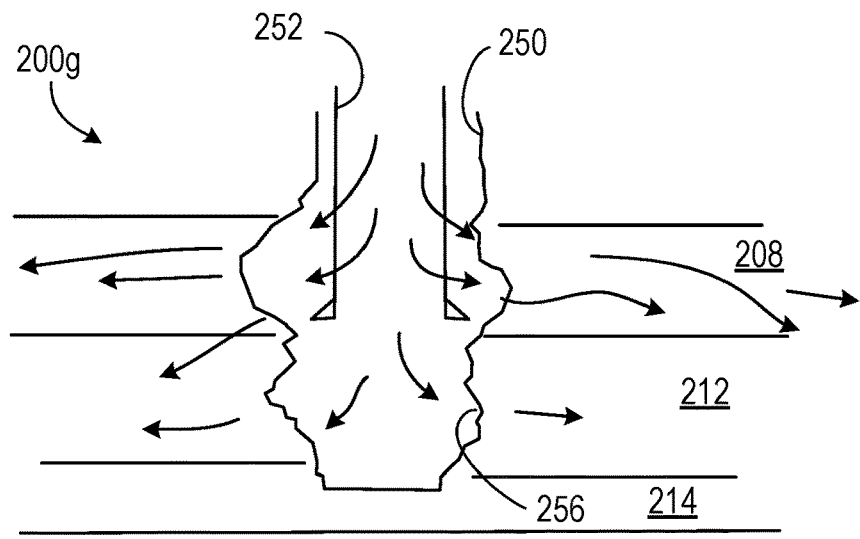

FIG. 2G is a schematic profile view diagram showing the injection well 200g, which includes a wellbore 250 having a cemented casing 252 and an open hole below the casing 256 formed through the second subterranean zone 208, the third subterranean zone 212, which is the producing zone of interest, and the fourth subterranean zone 214. Internal portions of the wellbore 250 have been enlarged, e.g., due to corrosion of portions of the casing 252 and erosion of the cement or wellbore 250 at subterranean zone 208, erosion or dissolution of the wellbore 250 across subterranean zone 212, combinations of them, or other reasons. The lines represent vertical bypass of injected well fluid outside the producing zone of interest (i.e., subterranean zone 212 in this example) into other non-producing zones (i.e., subterranean zone 208 in this example) resulting in loss of well fluid being injected into the producing zone of interest (i.e., subterranean zone 212 in this example). In this example, the other non-producing zones (208) become thief zones, diverting injection well fluid away from the producing zone 212.

Figure 2H:
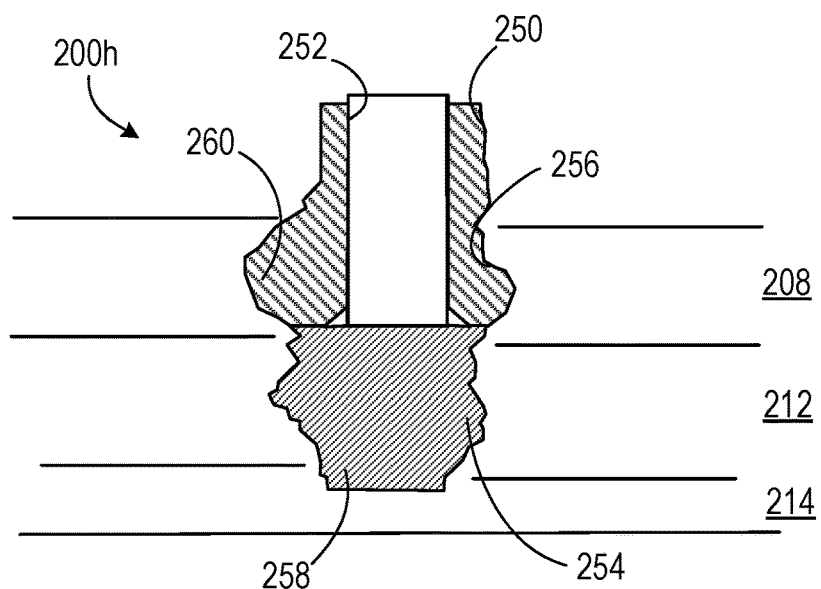
FIG. 2H is a schematic profile view diagram showing well treatment to internal portions of an injection well.

FIG. 2H is a schematic profile view diagram showing an example of well treatment to internal portions of the injection well 200h. As described above with reference to FIG. 2G, the injection well 200h includes an enlargement 260 to an internal portion 256 of the wellbore 250 that is above the open hole 254 (i.e., adjacent the cemented casing 252) and an enlargement 258 to an internal portion of the open hole 254. To treat the enlarged internal portions and restore the flow of the injected well fluid into the producing zone 212, a volume of the enlarged internal portions are determined. Such a treatment may be conducted as follows. The enlarged internal portion 258 across the producing zone 212 is filled with a treatment fluid which is a temporary blocking, or fill, effectively temporarily sealing off the open hole 254 across producing zone 212. Then, enlargement 260 is filled with a volume of treatment fluid which is a permanent block or fill (e.g., sealant, cement, permanent block, plug, fill, or other treatment fluid) to isolate the thief zone 208. These two procedures require knowledge of the hole size so that treatment volume which is substantially equal to or greater than the volumes of the enlarged internal portions 254 may be determined. Following placement of the permanent block across the enlarged section 260, the temporary block across the enlarged section 254 releases and is recovered, opening communication for injected well fluid flow down the wellbore 250 and substantially into the producing zone 212.

Example wellbore configurations and downhole conditions leading to suboptimal fluid injection, and treatment processes are described here. Wellbore configurations, downhole conditions leading to suboptimal fluid injections and treatment processes other than those described here are also possible.

Techniques to determine the volume of the enlarged internal portion are described below with reference to FIGS. 3 and 4. Example techniques are described here for treating injection wells. The techniques can be applied to treat any type of well and/or to determine a volume of an internal portion of a well for purposes other than well treatment. For example, in drilling, wellbores are sometimes under-reamed to provide a larger wellbore radius, such as below an intermediate casing shoe. The techniques described here can be implemented to accurately visualize and evaluate the geometry of the enlarged wellbore section. Another example wellbore operation is cementing, where a wellbore exhibits significant washout sections, such that a standard mechanical caliper cannot accurately determine the size of the wellbore. The techniques described here can be implemented to yield an accurate calculation of wellbore volume, resulting in more accurate cement calculations and cementing operations.

A further example is stimulation, e.g., in a vertical wellbore in areas where horizontal stresses are significantly different. In such areas, the wellbore often exhibits breakouts, or spalling of sections of the wellbore due to tensile and compressive forces caused by the in situ stresses resulting in wellbore distortion. In addition to the visual depiction of the condition of the wellbore, the techniques described here can provide dimensions of the wellbore, such that the orientation of the elongation of the diameter can be used to determine or verify horizontal stress directions. This determination can then correlate to probable orientation of subsequent induced hydraulic fractures. The techniques described here can be implemented, e.g., as computer-implemented methods, computer systems, and computer-readable storage media to determine a volume of an internal portion of a wellbore that needs treatment using acoustic logging data.

Figure 3:
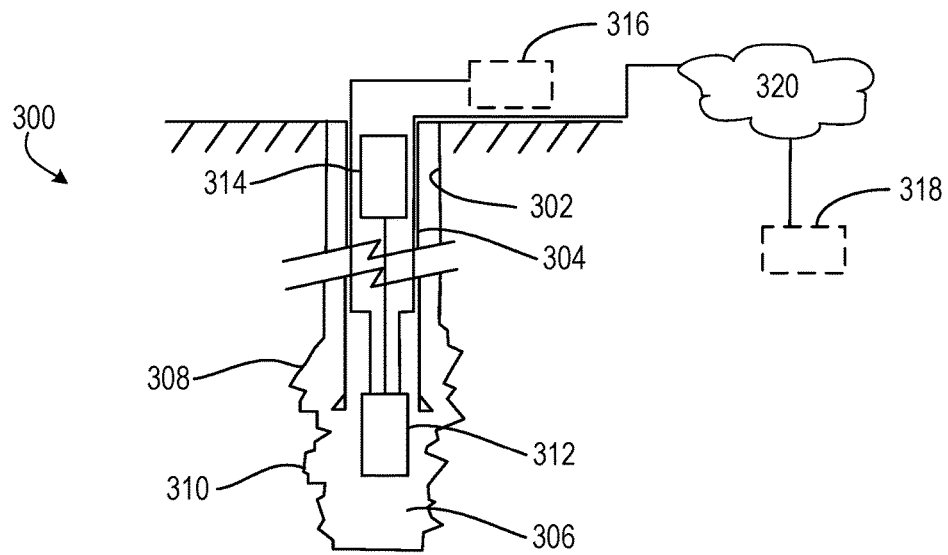
FIG. 3 is a schematic profile view diagram showing a remotely positioned computer system for determining a volume of a fluid loss treatment to treat a portion of a wellbore.

FIG. 3 is a schematic profile view diagram showing a remotely positioned computer system for determining a volume of a fluid loss treatment to treat a portion of a wellbore. In general, the well 300 can be any well that is experiencing well fluid loss, e.g., an injection well, a production well, or other well through which well fluid is flowed. In some implementations, the well 300 includes a wellbore 302 formed through a subterranean zone. The well 300 includes a casing 304 positioned in the wellbore 302 down to a specified well depth and an open hole 306 extending into the subterranean zone below the casing 304. The well 300 includes an enlargement 308 in the cased portion (e.g., adjacent to the end of the casing 304) and an enlargement 310 in the open hole 306. The enlargements can be caused by one or more of the reasons described above, e.g., wellbore erosion, wellbore dissolution, corrosion of the casing, combinations of them, or other reasons.

For example, the well 300 (e.g., an injection well or a production well) can be determined as experiencing well fluid loss. To do so, injection rate data for multiple wells can be evaluated, e.g., by plotting injection/production and/or in another manner, and normalized for parameters, e.g., formation thickness, pressure, or other parameters. Vertical flow profiling with a fluid survey (e.g., a spinner survey and/or other fluid survey) can be done to help determine the amount of fluid flowing into each zone, aiding in identification of potential thief zones. The well 300 can, alternatively or in addition, be evaluated using indicators, e.g., water dyes, chemical tracers, or other indicators. For example, a time taken for the indicators to pass from the well 300 to one or more adjacent wells can be determined. Fast times can indicate direct communication. Time to breakthrough can be compared to calculated or modeled time required for porous media flow at reservoir conditions in a distributed, uniform manner such as shown in FIG. 1A. Faster times can indicate more pipe- or channel-like flow and eroded flow parts. By such evaluation, it can be determined that the well 300 includes defects resulting in well fluid loss, e.g., the enlargements 308 and 310.

An acoustic logging tool 312 can be moved through the well 300, e.g., past locations near the enlargements 308 and 310. The acoustic logging tool 312 can continuously scan the wall of the wellbore 302 at multiple locations to obtain wellbore data including acoustic logging data. For example, the acoustic logging tool 312 can implement a piezoelectric ultrasonic transducer on a rotating head having a firing rate of 45-360 shots/scan and a vertical scan rate of 4-72 scan/ft. In some implementations, the acoustic logging tool 312 can scan multiple locations on a plane that is transverse to the longitudinal axis of the wellbore 302 and is at a certain depth. The acoustic logging tool 312 can similarly scan multiple locations on respective multiple planes, each at a respective depth in the wellbore 302.

By continuously scanning multiple locations, the acoustic logging tool 312 can obtain wellbore data which can include multiple values. Each value represents a distance to the innermost diameter, either that of the casing 304 or the wall of the wellbore 302, at the location from a reference location, e.g., a location of the acoustic logging tool 312, at a depth in the wellbore 302. For example, the acoustic logging tool 312 can continuously scan, at a specified depth, several (such as two, four, twenty, or more) locations to obtain multiple distances to the innermost diameter, either the casing 304 or the wall of the wellbore 302, at the specified depth. Collectively, where the well is open hole (i.e., 306 and 310 in FIG. 3) the acoustic logging data can define an internal shape of the wall of the wellbore 302 at the multiple locations around the perimeter of the wellbore 302. In particular, the acoustic logging data collected as described above represents actual distances to the internal wall of the open hole sections of wellbore 302 as opposed to average distances. The number of locations at which the acoustic logging tool 312 can identify the multiple values can be significantly greater (e.g., at least one order of magnitude greater) than the number of locations at which other tools (e.g., mechanical calipers) can identify similar values.

The acoustic logging tool 312 can be operated to continuously scan the internal portions of the wellbore 302 which includes the defects resulting in well fluid loss, e.g., the enlargement 310 or internal diameter defects indicating corrosion in the casing 304, thinning of the wall of casing 304, and void space behind casing, inferring void space 308. By doing so, the acoustic logging tool 312 can obtain multiple values representing distances to the internal diameter of the portion of the wellbore 302 that includes the enlargement 310 and indicators of the existence of enlargement 308.

A computer system 314 can be positioned remotely from the multiple locations at which the multiple values are obtained by the acoustic logging tool 312 to receive the wellbore data including the acoustic logging data from the acoustic logging tool 312. In some implementations, the computer system 314 can be positioned within the wellbore 302 at a location that is remote, relative to the acoustic logging tool 312. Alternatively, a computer system 316 can be positioned at a terranean surface of the well 300; a computer system 318 can be positioned at a location remote from the well 300. The acoustic logging tool 312 and the computer system 314 can be connected, e.g., using wired or wireless networks (such as the network 320).

The computer system 314 can include one or more processors 350 and a computer-readable medium 352 storing computer instructions, executable by the one or more processors 350 to perform operations described below with reference to FIG. 4, which is a flowchart of a process 400 for determining a volume of a fluid loss treatment to treat a portion of a wellbore. In some implementations, the computer system 314 (or the computer system 316 or the computer system 318 or combinations of them) can implement the process 400.

Figure 4:
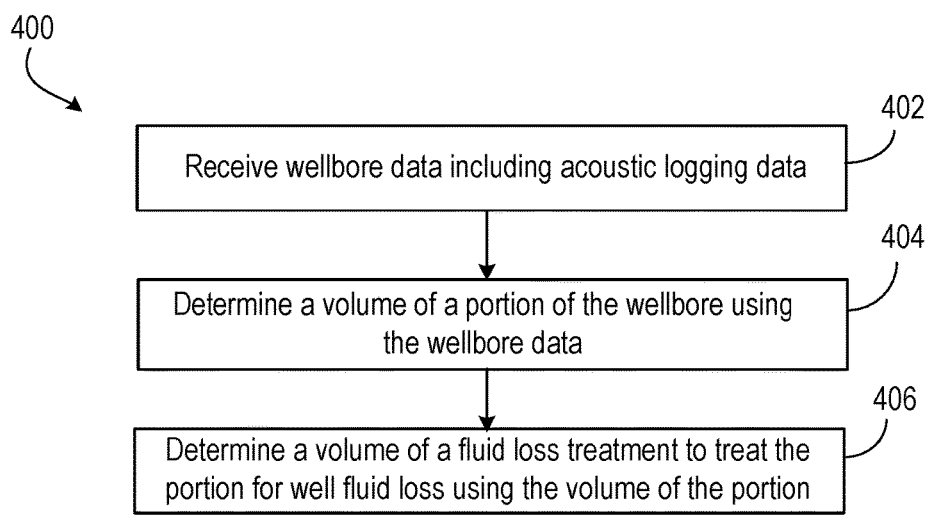
FIG. 4 is a flowchart of a process for determining a volume of a fluid loss treatment to treat a portion of a wellbore.

In FIG. 4, at 402, wellbore data including acoustic logging data is received. As described above, the acoustic logging data includes multiple values obtained by the acoustic logging tool 312 at multiple transverse locations positioned at the same depth, and similarly at multiple depths. Collectively, the acoustic logging data defines an internal shape of the casing 304 or wall of the open hole sections of wellbore 302 at the multiple locations around the perimeter of the casing 304 or open hole wellbore 302. In implementations in which the acoustic logging tool 312 is positioned in the wellbore 302 adjacent the enlargement 310, the computer system 314 can receive, from the acoustic logging tool 312, acoustic logging data that includes multiple values representing distances to the wall of the portion of the open hole wellbore 302 that includes the enlargement 310. When inside the casing 304, the acoustic logging tool 312 can send acoustic logging data to the computer system 314 including details about the inside diameter and thickness of casing 304, as well as whether a void space or solid cement occupies the annular space between casing 304 and wellbore 302, indicating casing corrosion and inferring enlargement 308.

In some implementations, at a specified depth in the wellbore 302, the acoustic logging tool 312 measures radial distances from a reference location (e.g., a center of or other reference location in the open hole 306 which includes the enlargement 310). For each of multiple rotational positions around the reference location at the specified depth, the acoustic logging tool 312 measures a radial distance to the internal wall of the wellbore 302. For example, at a first rotational position ($P_1$), the acoustic logging tool 312 measures a first radial distance ($R_1$). The acoustic logging tool 312 is turned by a specified angular distance (e.g., 10 degrees or other smaller or greater angular distance, clockwise or counter-clockwise) to a second rotational position ($P_2$) at which the acoustic logging tool 312 measures a second radial distance ($R_2$). In this manner, the acoustic logging tool 312 is turned to multiple rotational positions (e.g., $P_3$, $P_4$, . . . , $P_n$) and a radial distance ($R_2$, $R_3$, $R_4$, . . . , $R_n$) is measured at each rotational position. The acoustic logging tool 312 is moved to different specified depths in the wellbore 302. At each specified depth, the acoustic logging tool 312 is turned to multiple rotational positions at which the acoustic logging tool 312 measures corresponding radial distances. The acoustic logging tool 312 transmits the measurements to the computer system 314.

At 404, a volume of an open hole portion of the wellbore can be determined using the wellbore dimensional data gathered in 402. In some implementations, the computer system 314 can determine the volume of the portion of the wellbore 302 which includes the enlargement 310 using the acoustic logging data that defines the internal shape of the wall of the wellbore 302 at multiple sets of transverse locations, each set of transverse locations positioned at a respective depth in the portion of the wellbore 302 which includes the enlargement 310. In particular, the computer system 314 can determine the volume of the enlargement 310 using the actual data measured by the acoustic logging tool 312, the actual data representing distances from a reference location to multiple locations of the internal wall of the wellbore 302. To do so, the computer system 314 can implement a pie-wedge area calculation described below.

At a specified depth, the computer system 314 can determine an area ($A_{1,2}$) of a pie-wedge covered between two consecutive rotational positions (e.g., $P_1$ and $P_2$). In this manner, the computer system 314 can determine multiple areas of pie-wedges covered between consecutive rotational positions (e.g., $A_{2,3}$ for $P_2$ and $P_3$, $A_{3,4}$ for $P_3$ and $P_4$, and $A_{n-1,n}$ for $P_{n-1}$ and $P_n$). The computer system 314 can sum the multiple areas of pie-wedges to determine an area of the open hole section of wellbore 302 at the specified depth. The computer system 314 can repeat the pie-wedge calculation at multiple specified depths, and sum the multiple areas at the multiple specified depths to determine the volume of the open hole section of wellbore 302. In this manner, the computer system 314 can implement the pie-wedge calculation to determine the volume of the enlargements using the actual data measured by the acoustic logging tool 312. The ability of the acoustic logging tool 312 to be turned to multiple rotational positions to measure radial distances results in the areas measured by the computer system 314 being more accurate than areas measured using other techniques, e.g., using caliper tools. The error in the measured area decreases with an increase in the rotational positions at which the acoustic logging tool 312 measures radial distances.

In some implementations, the computer system 314 can be connected to a display device (not shown), e.g., positioned at the terranean surface of the wellbore 302. The computer system 314 can generate a three-dimensional view of the internal shape of the portion of the wellbore 302, and display the three-dimensional view in the display device. This view could be of the surface of the inside diameter of the casing or the thickness of the casing in a cased hole section of the wellbore 302, or the view could be of the shape of the open hole section, including enlargement (e.g., 310).

As described above, in some implementations, the acoustic logging data received from the acoustic logging tool 312 includes data that represents distances of multiple locations from a reference location at specified depths. The computer system 314 can execute operations to determine a distance of the wall of the wellbore 302 from a reference location at each location at each depth. In this manner, the computer system 314 can process the received acoustic logging data to determine several distances from the reference location at several transverse locations positioned at the same depth in the wellbore 302. From the several distances determined at a specified depth, the computer system 314 can determine an internal shape at the specified depth. The computer system 314 can repeat these processes to determine multiple corresponding distances at several depths, and determine internal shapes at each specified depth of an open hole section of the wellbore 302. The computer system 314 can then stack and orient the shapes at different depths to determine the volume of the internal shape and/or to generate the three-dimensional view.

The three-dimensional view of the open hole section can offer insight to potential causes of well fluid loss, e.g., erosion or dissolution at the portion of the wellbore 302. For example, instead of a cylinder representing the drilled hole, the three-dimensional would show features, e.g., bulges, wings, distortions, or other features, that represent eroded and missing borehole rock. When compared in depth to the reservoir layers, a viewer of the three-dimensional view can correlate likely fluid losses with specific formation layers. When evaluated with respect to azimuth, a significant hole or channel could indicate a preferential direction for well fluid flow, which can be compared to tracer survey or flow modeling, (or both) the results for early breakthrough to a producing well. This diagnosis can aid in understanding possible fluid flow downhole. Such evaluation, taken alone or in combination with the flow profile results, can verify the internal portions of the wellbore 302 that need treatment to stop well fluid losses or to divert well fluid flow to other zones (or both).

At 406, a volume of a fluid loss treatment to treat the portion for well fluid loss can be determined using the volume of the open hole portion determined, as described above. The fluid loss treatment can include filling the defects, e.g., the enlargements with a volume of material that is sufficient to eliminate, and, in some instances, minimize or decrease, the enlargements. For example, filling an enlargement with the material can include filling the entirety of the enlargement with a volume of the fluid loss treatment that is substantially equal to or greater than the volume of the enlargement. The fluid loss treatment can, alternatively or in addition, include an additional volume of material to account for migration of treatment fluid into the surrounding rock. Calculation of the appropriate volume of treatment fluid will depend on the nature of the determined volume and geometry of the wellbore and the purpose of the treatment. By way of example, for a given depth in the wellbore it may be desirable to place a temporary block across a specific section of productive zone. In such a case the treatment fluid volume might be equal to or only slightly (e.g. less than or equal to 5%) greater than or less than the calculated wellbore volume across that depth interval. In another example, if it was determined that a pipe-like conduit of flow existed between an injection well and a corresponding producing well, then a permanent block sealing fluid volume of significantly greater than (e.g. between 5% and 50%) the calculated wellbore volume might be determined. Such material can include, e.g., cement, polymeric sealant, particulates such as sand or other particulates, which may or may not be dispersed in a fluid, combinations of them, or other materials.

In some implementations, the fluid loss treatment can include injecting a permanent well treatment fluid (e.g., sealant, cement, permanent block, plug, fill, or other permanent well treatment fluid) to permanently treat the portion of the wellbore 302. Alternatively, or in addition, the fluid loss treatment can include determining a volume of a temporary well treatment fluid to temporarily treat the internal portion of the wellbore 302. For example, the material to treat the enlargement 308 adjacent the casing 304 can include cement. This method can determine the volume for a temporary well treatment fluid to be flowed through the wellbore 302 to fill the open hole 306 including the enlargement 310. When the temporary well treatment fluid sets, the open hole 306 can be impermeable to fluid flow. Then, a permanent well treatment fluid, e.g., the fluid including cement, can be flowed through the wellbore 302 to fill the enlargement 308 adjacent the casing 304. After the permanent well treatment fluid has set, the temporary well treatment fluid can be removed from the open hole 306.

In general, certain aspects of the subject matter described here can be implemented as a method. One or more processors receive wellbore data including acoustic logging data defining an internal shape of a wall of a wellbore at multiple locations around the perimeter of the wellbore. The one or more processors are located remotely from the multiple locations. The one or more processors determine volume of an open hole portion of the wellbore that includes the multiple locations using the wellbore data. Using the volume of the portion of the wellbore, a volume of a fluid loss treatment to treat the portion of the wellbore for well fluid loss is determined.

This, and other aspects, can include one or more of the following features. The wall of the wellbore can be continuously scanned at the multiple locations around the perimeter of the wellbore to obtain the acoustic logging data. The portion of the wellbore can be enlarged relative to other sections of the wellbore. Determining the volume of the fluid loss treatment can include determining the volume of the fluid loss treatment to be substantially equal to or greater than the volume of the open hole portion of the wellbore. Determining the volume of the fluid loss treatment can include determining a volume of a temporary well treatment fluid to treat the uncased, open hole portion of the wellbore for well fluid loss. An uncased portion of the wellbore can be treated for well fluid loss with the volume of the temporary well treatment fluid. The uncased portion of the wellbore can be enlarged relative to other uncased portions of the wellbore. A wellbore treatment to treat the portion of the wellbore can be determined based, in part, on the volume of the fluid loss treatment and the location of the portion in the wellbore. The one or more processors can be located at a surface of the wellbore. The wellbore data can be displayed on a display device connected to the one or more processors at the surface of the wellbore. A three-dimensional view of the internal shape of the portion of the wellbore can be displayed on the display device. The wellbore can be identified based, in part, detecting loss of well fluid injected into the wellbore. Detecting loss of well fluid injected into the wellbore can include evaluating well fluid injection rate data for multiple wells. The well fluid injection rate data can be normalized for multiple well parameters.

Certain aspects of the subject matter described here can be implemented as a method. One or more processors positioned at a terranean surface of the wellbore determine a volume of an open hole portion of the wellbore using wellbore data including acoustic logging data defining an internal shape of a wall of the wellbore at multiple transverse locations positioned at the same depth in the wellbore. The acoustic logging data is received by the one or more processors at the terranean surface. Using the volume of the open hole portion of the wellbore, a volume of a fluid loss treatment to treat the portion of the wellbore for well fluid loss is determined.

This, and other aspects, can include one or more of the following features the wall of the wellbore can be continuously scanned at the multiple transverse locations to obtain the acoustic logging data. The cased hole portion of the wellbore can be corroded. The open hole portion of the wellbore can be enlarged relative to other sections of the wellbore. Determining the volume of the fluid loss treatment can include determining the volume of the fluid loss treatment to be substantially equal to or greater than the volume of the open hole portion of the wellbore. A volume of a temporary or permanent well treatment fluid to treat an open hole portion of the wellbore for fluid loss can be determined. The cased portion of the wellbore can be enlarged relative to other cased portions of the wellbore, inferred by void space behind the casing. A volume of a temporary or permanent well treatment fluid to treat an uncased, open hole portion of the wellbore for well fluid loss can be determined. The uncased portion of the wellbore can be enlarged relative to other uncased portions of the wellbore.

Certain aspects of the subject matter described here can be implemented as a wellbore system. The system includes one or more processors, and a computer readable medium storing instructions, executable by the one or more processors to perform operations described here. The term "processors" encompasses all kinds of apparatus, devices, and machines for processing data, including by way of example a programmable processor, a computer, a system on a chip, or multiple ones, or combinations, of the foregoing. A processor can include special purpose logic circuitry, for example, an FPGA (field programmable gate array) or an ASIC (application-specific integrated circuit). The processor can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The processor and execution environment can realize various different computing model infrastructures, such as web services, distributed computing and grid computing infrastructures.

A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical and/or non-transitory components or media (for example, multiple CDs, disks, or other storage devices).

A number of implementations have been described. Nevertheless, it will be understood that various modifications may be made without departing from the scope of the disclosure.

The invention claimed is:

1. A method comprising:
   rotating an ultrasonic acoustic logging tool positioned adjacent to an eroded portion of an injection wellbore at at least two depths of a plurality of depths of the tool adjacent to the eroded portion of the injection wellbore;
   receiving from the ultrasonic acoustic logging tool, by one or more processors, data defining an internal shape of the eroded portion at a plurality of locations around a perimeter of the injection wellbore for each of the at least two depths of the plurality of depths;
   using the data to determine, by the one or more processors, a three-dimensional representation of a volume of the eroded portion; and
   determining, using the three-dimensional representation, a volume of fluid loss treatment to treat the eroded portion for well fluid loss.

2. The method of claim 1, wherein the eroded portion is enlarged relative to other portions of the injection wellbore.

3. The method of claim 1, wherein the eroded portion includes an open hole below a casing in the injection wellbore.

4. The method of claim 1, wherein the eroded portion includes a volume behind a casing in the injection wellbore.

5. The method of claim 4, wherein the fluid loss treatment for the eroded portion behind the casing is a permanent well treatment fluid.

6. The method of claim 5, wherein a temporary fluid loss treatment is applied in the injection wellbore below a casing before the permanent well treatment fluid is applied and then removed after the permanent well treatment fluid is applied.

7. The method of claim 1, wherein the one or more processors are located remotely from the plurality of locations.

8. The method of claim 1, wherein the one or more processors are located at a surface of the injection wellbore.

9. The method of claim 1, wherein the three-dimensional representation of the volume of the eroded portion is displayed on a display device connected to the one or more processors at a surface of the injection wellbore.

10. The method of claim 1, wherein the determination of the volume of fluid loss treatment is made upon detecting a loss of well fluid in the injection wellbore.

11. The method of claim 10, wherein the detecting of the loss of well fluid comprises evaluating a normalized well injection fluid rate for a plurality of the injection wells.

12. A wellbore system comprising:
   one or more processors; and
   a non-transitory computer-readable medium storing instructions executable by the one or more processors to perform operations comprising:
      rotating an ultrasonic acoustic logging tool positioned adjacent to an eroded portion of an injection wellbore at at least two depths of a plurality of depths of the tool adjacent to the eroded portion of the injection wellbore;
      receiving from the ultrasonic acoustic logging tool, by the one or more processors, data defining an internal shape of the eroded portion at a plurality of locations around a perimeter of the injection wellbore for each of the at least two depths of the plurality of depths;
      using the data to determine, by the one or more processors, a three-dimensional representation of a volume of the eroded portion; and
      determining, using the three-dimensional representation, a volume of fluid loss treatment to treat the eroded portion for well fluid loss.

13. The system of claim 12, wherein the eroded portion is enlarged relative to other portions of the injection wellbore.

14. The method of claim 12, wherein the eroded portion includes an open hole below a casing in the injection wellbore.

15. The method of claim 12, wherein the eroded portion includes a volume behind a casing in the injection wellbore.

16. The method of claim 15, wherein the fluid loss treatment for the eroded portion behind the casing is a permanent well treatment fluid.

17. The method of claim 16, wherein a temporary fluid loss treatment is applied in the injection wellbore below a casing before the permanent well treatment fluid is applied and then removed after the permanent well treatment fluid is applied.

18. The method of claim 12, wherein the one or more processors are located remotely from the plurality of locations.

19. The method of claim 12, wherein the one or more processors are located at a surface of the injection wellbore.

20. The method of claim 12, further comprising a display device connected to the one or more processors that displays the three-dimensional representation of the volume of the eroded portion.

21. The method of claim 12, wherein the determination of the volume of fluid loss treatment is made upon detecting a loss of well fluid in the injection wellbore.

22. The method of claim 21, wherein the detecting of the loss of well fluid comprises evaluating a normalized well injection fluid rate for a plurality of the injection wells.

* * * * *